United States Patent [19]

Merrick

[11] Patent Number: 5,023,641
[45] Date of Patent: Jun. 11, 1991

[54] PINHOLE CAMERA WITH ADJUSTABLE FOCAL LENGTH

[76] Inventor: Frank J. Merrick, 789 Willow Rd., Harvey, Mich. 49855

[21] Appl. No.: 582,372

[22] Filed: Sep. 14, 1990

[51] Int. Cl.⁵ .................. G03B 13/32; G03B 17/02
[52] U.S. Cl. .................. 354/195.1; 354/288; 354/289.1
[58] Field of Search .............. 354/187, 195.1, 202, 354/288, 289.1, 289.11

[56] References Cited

U.S. PATENT DOCUMENTS

| | | | |
|---|---|---|---|
| 1,298,312 | 3/1919 | Earle | 354/187 |
| 1,366,158 | 1/1921 | Brown | 354/187 |
| 2,143,385 | 1/1939 | Platt | 354/187 |
| 2,559,214 | 7/1951 | Fried | 354/187 |
| 2,751,825 | 6/1959 | Fried | 354/187 |
| 2,789,490 | 4/1957 | Kaufman | 354/187 |
| 3,640,195 | 2/1972 | Zimmermann et al. | 354/288 |
| 4,256,392 | 3/1981 | Stemme et al. | 354/288 X |

*Primary Examiner*—A. A. Mathews

[57] ABSTRACT

The invention pertains to cameras and more particularly to pinhole cameras. A method is provided whereby the focal length of a pinhole camera may be adjusted by varying the distance between the pinhole, functioning as the lens, and the photographic paper, serving as film. This adjustment may be made by the user any time before exposure.

4 Claims, 1 Drawing Sheet

PINHOLE CAMERA WITH ADJUSTABLE FOCAL LENGTH

BACKGROUND OF THE INVENTION

1. Field of the Invention

This invention relates in general to cameras and in particular to cameras using a pinhole as a lens.

2. Prior Art

Pinhole cameras are often used as the starting point for instruction in the science of film photography. They illustrate a number of basic concepts including exposure, focal length, and angle of view.

Unfortunately, current pinhole camera designs have a fixed focal length. This limits both their instructive and photographic utility. To overcome this limitation, a new design is needed.

SUMMARY OF THE INVENTION

The principal object of the present invention is to provide a pinhole camera with an adjustable focal length for photographic and instructional purposes.

It is also an object of the present invention to provide such a device whose focal length may be altered any time before use.

Another object of the present invention is to provide such a device which is of simple, inexpensive construction.

A further object of the present invention is to provide such a device which is easy to understand and use.

The foregoing objects can be accomplished by providing a pinhole camera of standard design with the addition of a movable photographic paper holder at the rear. This photographic paper holder may be manually adjusted towards or away from the pinhole at the front of the unit, thereby adjusting the camera's focal length, through the use of a rod connected to the paper holder's rear side and extending out through the back of the device. This rod will be marked in such a way as to indicate to the user the position of the photographic paper within. A seal surrounding the rod at the rear of the camera ensures that the unit will be light-tight.

DETAILED DESCRIPTION

Figure 1:
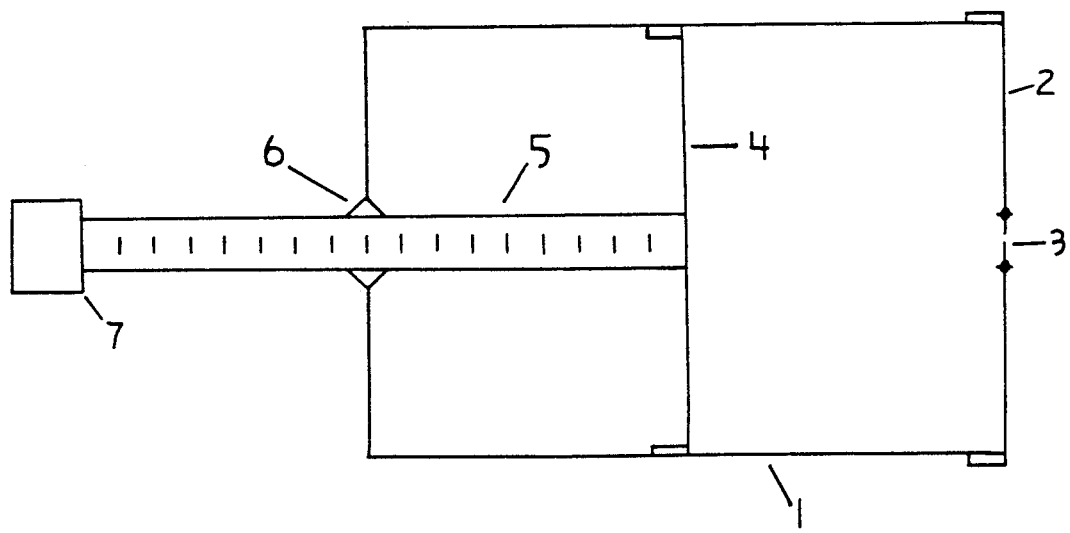
FIG. 1 is a cut-away view of a pinhole camera with adjustable focal length in accordance with the present invention.

Refer now to FIG. 1, which is an overall drawing of the preferred embodiment of the invention.

The camera body 1 may be manufactured of any material which will not allow light to pass through, such as opaque plastic. It's interior should be of uniform shape throughout the length of the camera to allow the photographic paper holder 4 free travel. The camera body 1 can be manufactured to any practical length, the greater length allowing for greater variance in focal length.

A removable camera end-cap 2 should be light-proof, preferably constructed of material similar to the camera body 1, and made such a size as to be able to be slid on or off the camera body yet still provide the required light-tightness.

A pinhole 3 in the camera end-cap 2 serves as the lens of the camera. It should be constructed of some thin, tough material such as metal foil which will allow a sharp image to be formed yet be strong enough to withstand regular use. It may be integrated with camera end-cap 2 by any suitable means, such as gluing.

Photographic paper holder 4 holds the photographic paper used to capture the image in place during use. The photographic paper may be affixed to the photographic paper holder by any means that will hold the paper flat and securely in place, such as double-sided tape. The photographic paper holder 4 should be made such a size as to slide easily towards and away from the pinhole 3 within the camera body 1 through the use of the focal length adjustment rod 5.

The focal length adjustment rod 5 may be made of any strong, durable, opaque material. It is affixed to the photographic paper holder 4 by any secure means, such as through the use of a screw. The focal length adjustment rod 5 projects through the rear of the camera body 1. The focal length adjustment rod 5 is marked in such a way as to indicate to the user the position of the photographic paper holder 4 within the camera body. The position of the photographic paper holder will determine the focal length and angle of view of the camera.

A slide 6 is constructed of some opaque, flexible material such as rubber and integrated into the camera body 1. It allows the focal length adjustment rod 5 to slide in and out of the camera body 1 while preventing light from entering the camera and keeping the photographic paper holder 4 securely in place during exposure.

A handle 7 is attached to the focal length adjustment rod 5 for user convenience as a hand hold.

In use, the camera is taken into a darkroom and the end-cap is removed. A piece of photographic paper is cut to fit the camera shape and affixed to the photographic paper holder. The end-cap is replaced and the user places his finger over the pinhole to prevent light from entering the camera before he is ready for exposure. The user exits the darkroom and goes to the area he wishes to photograph. At this point, he chooses the focal length he wishes to use and slides the focal length adjustment rod in or out until the proper position is attained. He then steadies the camera against a solid object and points it toward the scene he wishes to capture. He removes his finger from the pinhole for the required exposure time. His finger back over the pinhole, he may walk back to the darkroom and proceed with photograph development.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

I claim:

1. A pinhole camera with an adjustable focal length comprising:
    an opaque camera housing;
    an opaque, removable camera end-cap slidably mounted on said camera body;
    a pinhole lens constructed of suitable material and attached to said camera end-cap;
    a photographic paper holder slidably mounted within said camera body so as to be slidable toward and away from said pinhole lens;

a focal length adjustment rod attached to said photographic paperholder; said focal length adjustment rod projects from said camera body and includes markings which indicate to the user the position of said photographic paper holder within said camera body;

a slide integrated into said camera body which allows said focal length adjustment rod to slide in and out of said camera body while preventing light from entering said camera;

a handle attached to said focal length adjustment rod for use as a hand hold.

2. The pinhole camera of claim 1 wherein the markings on said focal length adjustment rod indicate to the user the focal length of said camera for a particular position of the rod.

3. The pinhole camera of claim 1 wherein the markings on said focal length adjustment rod indicate to the user the angle of view of said camera for a particular position of the rod.

4. The pinhole camera of claim 1 wherein the markings on said focal length adjustment rod indicate to the user both the focal length and the angle of view of said camera for a particular position of the rod.

* * * * *